US010133637B2

(12) United States Patent
Lambert et al.

(10) Patent No.: US 10,133,637 B2
(45) Date of Patent: Nov. 20, 2018

(54) SYSTEMS AND METHODS FOR SECURE RECOVERY OF HOST SYSTEM CODE

(71) Applicant: Dell Products L.P., Round Rock, TX (US)

(72) Inventors: Timothy M. Lambert, Austin, TX (US); Johan Rahardjo, Austin, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 102 days.

(21) Appl. No.: 15/228,656

(22) Filed: Aug. 4, 2016

(65) Prior Publication Data

US 2018/0039546 A1 Feb. 8, 2018

(51) Int. Cl.
*G06F 11/14* (2006.01)
*G06F 11/07* (2006.01)
*G06F 11/263* (2006.01)

(52) U.S. Cl.
CPC ...... *G06F 11/1441* (2013.01); *G06F 11/0793* (2013.01); *G06F 11/1417* (2013.01); *G06F 11/1469* (2013.01); *G06F 11/2635* (2013.01); *G06F 11/1438* (2013.01); *G06F 11/1458* (2013.01)

(58) Field of Classification Search
CPC ............. G06F 11/2053; G06F 11/2056; G06F 11/2094; G06F 11/1666; G06F 21/57; G06F 21/572; G06F 21/575
See application file for complete search history.

(56) References Cited

U.S. PATENT DOCUMENTS

| 5,327,531 | A | 7/1994 | Bealkowski et al. |
| 5,471,674 | A | 11/1995 | Stewart et al. |
| 5,805,882 | A | 9/1998 | Cooper et al. |
| 6,167,532 | A | 12/2000 | Wisecup |
| 6,185,696 | B1 | 2/2001 | Noll |

(Continued)

OTHER PUBLICATIONS

Secure Firmware Validation and Update for Consumer Devices in Home Networking by Choi published by IEEE, Apr. 7, 2016 http://ieeexplore.ieee.org/document/7448561/ (Year: 2016).*

(Continued)

*Primary Examiner* — Joseph O Schell
(74) *Attorney, Agent, or Firm* — Jackson Walker L.L.P.

(57) ABSTRACT

A management controller may be configured to control connectivity among a host system processor, a primary ROM, and a recovery ROM in accordance with a plurality of modes of operation including at least a normal mode that occurs in response to absence of a corruption of the ROM code in which the management controller causes the host system processor to be communicatively coupled to the primary ROM and communicatively decoupled from the recovery ROM, such that the host system processor loads and executes the ROM code during boot of the host system, and a primary ROM recovery mode that occurs in response to presence of the corruption of the ROM code in which the management controller causes the host system processor to be coupled to the primary ROM and the recovery ROM, such that the host system processor loads and executes the recovery code during boot of the host system.

23 Claims, 2 Drawing Sheets

(56) References Cited

U.S. PATENT DOCUMENTS

| | | | | |
|---|---|---|---|---|
| 7,484,084 B1* | 1/2009 | Ranaweera | ............... | G06F 8/67 |
| | | | | 713/1 |
| 9,542,195 B1* | 1/2017 | Astarabadi | ............ | G06F 9/4411 |
| 9,836,606 B2* | 12/2017 | Tabone | ................... | G06F 21/57 |
| 2005/0229173 A1* | 10/2005 | Mihm | ....................... | G06F 8/65 |
| | | | | 717/171 |
| 2006/0020845 A1* | 1/2006 | Broyles, III | ........ | G06F 11/1417 |
| | | | | 714/2 |
| 2006/0143600 A1 | 6/2006 | Cottrell et al. | | |
| 2012/0023320 A1* | 1/2012 | Chen | ................... | G06F 11/0793 |
| | | | | 713/2 |
| 2014/0215134 A1* | 7/2014 | Tsai | .................... | G06F 12/0246 |
| | | | | 711/103 |
| 2016/0335005 A1* | 11/2016 | Dasari | ................. | G06F 12/0638 |

OTHER PUBLICATIONS

International Search Report and Written Opinion of the International Searching Authority, International Application No. PCT/US2017/044176, dated Oct. 12, 2017.

* cited by examiner

SYSTEMS AND METHODS FOR SECURE RECOVERY OF HOST SYSTEM CODE

TECHNICAL FIELD

The present disclosure relates in general to information handling systems, and more particularly to secure recovery of host system code in an information handling system, particularly code associated with a basic input/output system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include management controllers for out of band management of such information handling systems. In traditional systems, in order to provide for cryptographic functions associated with a host system and a management controller, each of the host system and management controller may "own" a respective cryptoprocessor. Such approach may have disadvantages, as it does not provide a way for the management controller to read a platform configuration register associated with the host system via the management controller remote management channel, and must instead be accessed via a host system application, which may render such communication of information open to an attack. These existing approaches also do not allow for side-band management of the host system's cryptoprocessor, do not allow for the management controller to derive a state of the host system's cryptoprocessor, or transmit a secure message that bridges the host system domain and the management controller domain.

SUMMARY

In accordance with the teachings of the present disclosure, the disadvantages and problems associated with existing approaches for providing cryptoprocessor functionality in an information handling system may be reduced or eliminated.

In accordance with embodiments of the present disclosure, an information handling system may include a host system and a management controller. The host system may include a host system processor, a primary ROM for storing ROM code for execution by the host system processor, and a recovery ROM for storing recovery code for execution by the host system processor in an event of corruption of the ROM code. The management controller may be communicatively coupled to the host system processor and configured to provide management of the information handling system via management traffic communicated between the management controller and a dedicated management network external to the information handling system. The management controller may be further configured to control connectivity among the host system processor, the primary ROM, and the recovery ROM in accordance with a plurality of modes of operation including at least a normal mode of operation that occurs in response to absence of a corruption of the ROM code in which the management controller causes the host system processor to be communicatively coupled to the primary ROM and communicatively decoupled from the recovery ROM, such that the host system processor loads and executes the ROM code during boot of the host system and a primary ROM recovery mode of operation that occurs in response to presence of the corruption of the ROM code in which the management controller causes the host system processor to be communicatively coupled to the primary ROM and the recovery ROM, such that the host system processor loads and executes the recovery code during boot of the host system.

In accordance with these and other embodiments of the present disclosure, an information handling system may include a host system and a management controller. The method may include controlling connectivity among a host system processor of a host system of an information handling system, a primary read-only memory (ROM) of the host system for storing ROM code for execution by the host system processor, and a recovery ROM of the host system for storing recovery code for execution by the host system processor in an event of corruption of the ROM code, in accordance with a plurality of modes of operation including at least a normal mode of operation that occurs in response to absence of a corruption of the ROM code in which the controlling of connectivity causes the host system processor to be communicatively coupled to the primary ROM and communicatively decoupled from the recovery ROM, such that the host system processor loads and executes the ROM code during boot of the host system, and a primary ROM recovery mode of operation that occurs in response to presence of the corruption of the ROM code in which the controlling of connectivity causes the host system processor to be communicatively coupled to the primary ROM and the recovery ROM, such that the host system processor loads and executes the recovery code during boot of the host system.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to control connectivity among a host system processor of a host system of an information handling system, a primary read-only memory (ROM) of the host system for storing ROM code for execution by the host system processor, and a recovery ROM of the host system for storing recovery code for execution by the host system processor in an event of corruption of the ROM code, in accordance with a plurality of modes of operation including at least a normal mode of operation that occurs in response to absence of a corruption of the ROM code in which the controlling of connectivity causes the host system processor to be communicatively coupled to the primary ROM and communicatively decoupled from the recovery ROM, such that the host system processor loads and executes the ROM code during boot of the host system, and a primary ROM recovery mode of operation that occurs in response to presence of the corruption of the ROM code in which the controlling of connectivity causes the host system processor to be communicatively coupled to the primary ROM and the recovery ROM, such that the host system processor loads and executes the recovery code during boot of the host system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
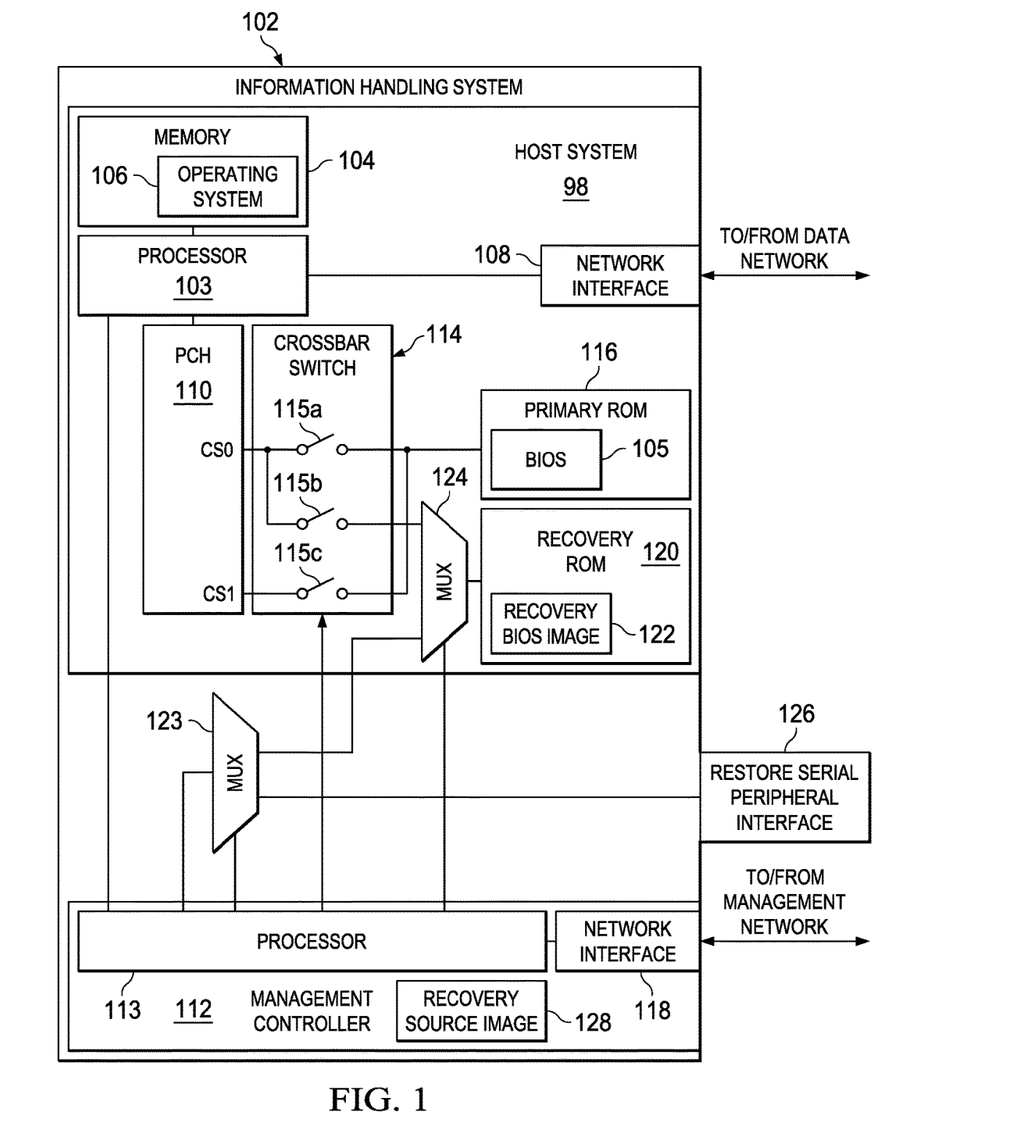
FIG. 1 illustrates a block diagram of an example information handling system, in accordance with embodiments of the present disclosure.
Figure 2:
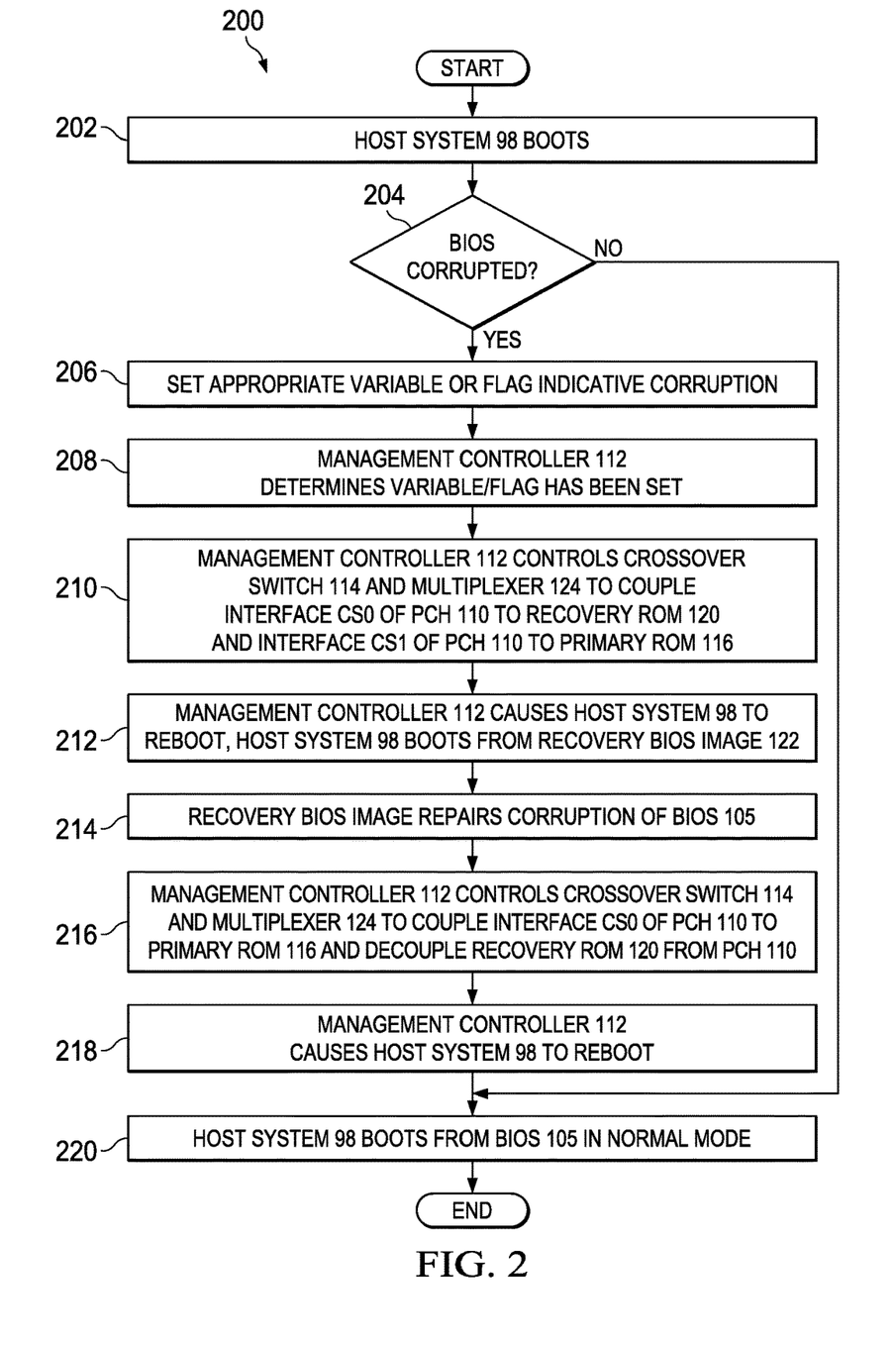
FIG. 2 illustrates a flowchart of an example method for secure recovery of host system code, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a network interface 108 communicatively coupled to processor 103, a platform controller hub (PCH) 110 communicatively coupled to processor 103, a crossbar switch 114 communicatively coupled to PCH 110, a primary read-only memory (ROM) 116 communicatively coupled to PCH 110 via crossbar switch 114, a recovery ROM 120 communicatively coupled to PCH 110 via crossbar switch 114 and multiplexer 124, and a multiplexer 123 coupled between a processor 113 of a management controller 112 on the one hand and recovery ROM 120 and a restore serial peripheral interface 126 on the other hand.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise any suitable system, apparatus, or device operable to serve as an interface between information handling system 102 and one or more other information handling systems via an in-band management network. Network interface 108 may enable information handling system 102 to communicate using any suitable transmission protocol and/or standard. In these and other embodiments, network interface 108 may comprise a network interface card, or "NIC." In some embodiments, network interface 108 may comprise a 10 gigabit Ethernet network interface. In these and other embodiments, network interface 108 may be enabled as a local area network (LAN)-on-motherboard (LOM) card.

PCH 110 may be any system, device, or apparatus configured to control certain data paths (e.g., data flow between processor 103, memory 104, and peripherals) and support certain functions of processor 103. A PCH 110 may also be known as a "chipset" of an information handling system 102.

Crossbar switch 114 may comprise a plurality of switches 115 (e.g., switches 115a, 115b, and 115c) that based on a control signal communicated from management controller 112, control connectivity among various components of information handling system 102, as described in greater detail elsewhere in this disclosure. For example, switch 115a may be coupled between a chip select 0 (CS0) interface of PCH 110 and primary ROM 116 such that when switch 115a is activated (e.g., enabled, closed, turned on), a communications path is established between PCH 110 and primary ROM 116 via the CS0 interface, and when switch 115a is deactivated (e.g., disabled, open, turned off), connectivity between PCH 110 and primary ROM 116 is broken. As another example, switch 115b may be coupled between the CS0 interface of PCH 110 and recovery ROM 120 such that when switch 115b is activated (and multiplexer 124 is also appropriately configured), a communications path is established between PCH 110 and recovery ROM 120 via the CS0 interface, and when switch 115a is deactivated, connectivity between PCH 110 and recovery ROM 120 is broken. As a further example, switch 115c may be coupled between a chip select 1 (CS1) interface of PCH 110 and primary ROM 116 such that when switch 115c is activated, a communications path is established between PCH 110 and primary ROM 116 via the CS1 interface, and when switch 115c is deactivated, connectivity between PCH 110 and primary ROM 116 is broken.

Primary ROM 116 may be communicatively coupled to PCH 110 via crossbar switch 114 and may include any system, device, or apparatus configured to retain program instructions and/or data for a period of time, and may include non-volatile memory that retains data after power to information handling system 102 is turned off. As shown in FIG. 1, primary ROM 116 may store a BIOS 105.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Although primary ROM 116 is depicted in FIG. 1 as storing BIOS 105, primary ROM 116 may store other code for host system 98 in addition to or in lieu of BIOS 105.

Recovery ROM 120 may be communicatively coupled to PCH 110 via crossbar switch 114 and multiplexer 124 and communicatively coupled to management controller 112 via multiplexer 123 and multiplexer 124, and may include any system, device, or apparatus configured to retain program instructions and/or data for a period of time, and may include non-volatile memory that retains data after power to information handling system 102 is turned off. As shown in FIG. 1, recovery ROM 120 may store a recovery BIOS image 122 which may comprise a back-up image that may be used to replace BIOS 105 in the event of a corruption in BIOS 105. Although recovery ROM 120 is depicted in FIG. 1 as storing recovery BIOS image 122, recovery ROM 120 may store other recovery images for code other than BIOS 105 in addition to or in lieu of recovery BIOS image 122.

Multiplexer 123 may comprise any system, device, or apparatus configured to, based on a control signal from management controller 112, selectively couple processor 113 of management controller 112 to one of multiplexer 124 and restore serial peripheral interface 126.

Multiplexer 124 may comprise any system, device, or apparatus configured to, based on a control signal from management controller 112, selectively couple recovery ROM 120 to one of multiplexer 123 and switch 115b of crossbar switch 114.

In operation, processor 103, memory 104, network interface 108, PCH 110, crossbar switch 114, primary ROM 116, and/or recovery ROM 120 may comprise at least a portion of a host system 98 of information handling system 102.

Management controller 112 may be configured to provide management facilities for management of information handling system 102. Such management may be made by management controller 112 even if information handling system 102 is powered off or powered to a standby state. Management controller 112 may include a processor 113, memory, a management network interface 118 separate from and physically isolated from data network interface 108, and a recovery source image 128. In certain embodiments, management controller 112 may include or may be an integral part of a baseboard management controller (BMC) or a remote access controller (e.g., a Dell Remote Access Controller or Integrated Dell Remote Access Controller). As shown in FIG. 1, management controller 112 may comprise a processor 113 and a network interface 118 communicatively coupled to processor 113.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in a memory and/or another component of information handling system 102 or management controller 112. As shown in FIG. 1, processor 113 may be communicatively coupled to processor 103. Such coupling may be via a Universal Serial Bus (USB), System Management Bus (SMBus), and/or one or more other communications channels.

Network interface 118 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." In some embodiments, network interface 118 may comprise a 1 gigabit Ethernet network interface. Recovery source image 128 may comprise a code image and may be embodied in any suitable computer-readable medium. As described in greater detail elsewhere, such recovery source image 128 may be downloaded to management controller 112 which may store a copy or substantial replica of recovery source image 128 as recovery BIOS image 122 and/or another code recovery code image to recovery ROM 120.

Restore serial peripheral interface 126 may comprise any suitable serial communication interface for retrieving data or other information by management controller 112.

In addition to processor 103, memory 104, network interface 108, PCH 110, crossbar switch 114, primary ROM 116, recovery ROM 120, management controller 112, and restore serial peripheral interface 126, information handling system 102 may include one or more other information handling resources.

In operation, components of information handling system 102 may implement a host system code recovery technique for recovering BIOS 105 using recovery BIOS image 122 and/or recovery source image 126, as described in greater detail elsewhere in this disclosure. To perform recovery, such technique may include at least three modes of operation. A first mode of operation may be referred to as the normal mode of operation. In the normal mode, host system 98 may boot from BIOS 105 stored on primary ROM 116. In such normal mode of operation, switch 115a may be activated, and switches 115b and 115b may be deactivated, such that interface CS0 of PCH 110 is coupled to primary ROM 116, while recovery ROM 120 is decoupled from any connectivity to PCH 110. Accordingly, recovery ROM 120 is not accessible to host system 98 in the normal mode, providing the security benefit of preventing host access to recovery ROM 120 such that recovery BIOS image 122 may not be comprised by host system 98 during normal mode.

A second mode of operation may be referred to as the recovery ROM update mode. In the recovery ROM update mode, host system 98 may boot from BIOS 105 stored on primary ROM 116, but may also cause an update of recovery BIOS image 122 from recovery source image 126. In such normal mode of operation, switch 115a may be activated, and switches 115b and 115b may be deactivated, such that interface CS0 of PCH 110 is coupled to primary ROM 116, while recovery ROM 120 is decoupled from any connectivity to PCH 110. However, in addition, during the recovery ROM update mode, management controller 112 may control multiplexers 123 and 124 to sequence the update of recovery BIOS image 122 from recovery source image 126. In the sequence, management controller 112 may first control multiplexer 123 such that management controller 112 is able to retrieve recovery source image 126. Thereafter, management controller 112 may control multiplexers 123 and 124 to create a communications path between management controller 112 and recovery ROM 120, in order to store all or a relevant portion of recovery source image 126 as recovery BIOS image 122. Once recovery BIOS image 122 is updated, management controller 112 may control multiplexers 123 and 124 to break the communications path between management controller 112 and recovery ROM 120. Notably, the recovery ROM update mode may executed at any time, whether or not BIOS 105 on primary ROM 116 is executing. Thus, recovery ROM update may occur on demand or as a background task unbeknownst to host system 98, and management controller 112 may update recovery ROM 120 without having to access primary ROM 116. In addition, recovery ROM 120 is not accessible to host system 98 in the recovery ROM update mode, providing the security benefit of preventing host access to recovery ROM 120 such that recovery BIOS image 122 may not be comprised by host system 98 during the recovery ROM update mode. In addition, when updating recovery BIOS image 122, management controller 112 may, prior to copying recovery BIOS image 122 to recovery ROM 120, management controller may verify integrity and authenticity (e.g., digital signature verification) of recovery BIOS image 122.

A third mode of operation may be referred to as the primary ROM recovery mode. In the primary ROM recovery mode, host system 98 may boot from recovery BIOS image 122 stored on recovery ROM 120. In such primary ROM recovery mode of operation, switches 115b and 115c may be activated, switch 115a may be deactivated, and management controller 112 may control multiplexer 124 such that interface CS0 of PCH 110 is coupled to recovery ROM 120, while interface CS1 of PCH 110 is coupled to primary ROM 116. During the primary ROM recovery operation, host system 98 may boot from recovery BIOS image 122 stored on recovery ROM 120, and in addition, recovery BIOS image 122 during its boot execution may cause relevant components of recovery boot image 122 to be copied to primary ROM 116, thus repairing any corruption of BIOS 105 that triggered the primary ROM recovery mode, such that the normal mode may execute on a subsequent boot of information handling system 102.

Another security benefit of the architecture of information handling system 102 is that primary ROM 116 is at all times isolated from the domain of management controller 112. Thus, primary ROM 116 can only be updated by recovery code of recovery BIOS image 122 stored on recovery ROM 120 in the primary ROM recovery mode.

FIG. 2 illustrates a flowchart of an example method 200 for secure recovery of host system code, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, host system 98 may initialize boot. At step 204, a boot assurance operation of processor 103 (e.g., Intel BootGuard) may detect whether the image of BIOS 105 is corrupted (e.g., does not match an "approved" hash for the image). If the image of BIOS 105 is corrupted, method 200 may proceed to step 206. Otherwise, method 200 may proceed to step 220. It should be noted that in some embodiments, a failure or corruption of host system 98, in addition or in lieu of corruption of BIOS 105, may trigger the primary ROM recovery steps detailed below.

At step 206, in response to the image of BIOS 105 being corrupted, the boot assurance operation may set an appropriate variable or flag indicative of such corruption (e.g., NodeManager BootGuard error status bit). At step 208, management controller 112 may (e.g., as a result of periodic polling) determine that such variable or flag has been set to indicate corruption of BIOS 105, to which management controller 112 may respond by entering the primary ROM recovery mode.

At step 210, in the primary ROM recovery mode, management controller 112 may activate switches 115b and 115c, deactivate switch 115a, and control multiplexer 124 such that interface CS0 of PCH 110 is coupled to recovery ROM 120, while interface CS1 of PCH 110 is coupled to primary ROM 116.

At step 212, management controller 112 may cause host system 98 to reboot, such that host system 98 boots from recovery BIOS image 122 stored on recovery ROM 120. At step 214, recovery BIOS image 122 during its boot execution may cause relevant components of BIOS 105 to be recovered and stored to primary ROM 116 (e.g., from recovery BIOS image 122, storage media accessible to management controller 112, external Universal Serial Bus storage device or other external storage device coupled to information handling system 102, etc.), thus repairing the corruption of BIOS 105 that triggered the primary ROM recovery mode. At step 216, after completion of the copying/repair of the image of BIOS 105 on primary ROM 116, management controller 112 may activate switch 115a and deactivate switches 115b and 115c, such that interface CS0 of PCH 110 is coupled to primary ROM 116, while recovery ROM 120 is decoupled from PCH 110. At step 218, management controller 112 may cause host system 98 to reboot.

At step 220, host system 98 may boot in the normal mode of operation. After completion of step 220, method 200 may end.

Although FIG. 2 discloses a particular number of steps to be taken with respect to method 200, it may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a host system comprising:
      a host system processor;
      a primary read-only memory (ROM) for storing ROM code for execution by the host system processor; and
      a recovery ROM for storing recovery code for execution by the host system processor in an event of corruption of the ROM code; and
   a management controller communicatively coupled to the host system processor and configured to provide management of the information handling system via management traffic communicated between the management controller and a dedicated management network external to the information handling system, the management controller further configured to control connectivity among the host system processor, the primary ROM, and the recovery ROM in accordance with a plurality of modes of operation including at least:
      a normal mode of operation that occurs in response to absence of a corruption of the ROM code in which the management controller causes the host system processor to be communicatively coupled to the primary ROM and communicatively decoupled from the recovery ROM, such that the host system processor loads and executes the ROM code during boot of the host system;
      a primary ROM recovery mode of operation that occurs in response to presence of the corruption of the ROM code in which the management controller causes the host system processor to be communicatively coupled to the primary ROM and the recovery ROM, such that the host system processor loads and executes the recovery code during boot of the host system; and
      a recovery ROM update mode in which the management controller causes the host system processor to be communicatively coupled to the primary ROM and communicatively decoupled from the recovery ROM and causes the management controller to be sequentially communicatively coupled to non-transitory computer-readable media having a recovery source image and communicatively coupled to the recovery ROM, such that the management controller updates the recovery ROM based on content of the recovery source image.

2. The information handling system of claim 1, wherein in the primary ROM recovery mode of operation, the management controller causes the host system processor to be communicatively coupled to the primary ROM and the recovery ROM such that the recovery code executing on the host system processor repairs the corruption of the ROM code.

3. The information handling system of claim 2, wherein in the primary ROM recovery mode of operation and responsive to a completion of copying of at least the portion of the recovery code to the primary ROM in order to repair the corruption of the ROM code, the management controller causes the host system processor to be communicatively coupled to the primary ROM and communicatively decoupled from the recovery ROM and further causes the host system to reboot, such that the host system processor loads and executes the ROM code during the reboot of the host system.

4. The information handling system of claim 1, wherein the management controller updates the recovery ROM without accessing the primary ROM.

5. The information handling system of claim 1, wherein the management controller verifies authenticity of the recovery source image before updating the recovery ROM.

6. The information handling system of claim 1, wherein the ROM code comprises a basic input/output system.

7. The information handling system of claim 1, wherein the management controller comprises a baseboard management controller.

8. A method comprising:
controlling connectivity among a host system processor of a host system of an information handling system, a primary read-only memory (ROM) of the host system for storing ROM code for execution by the host system processor, and a recovery ROM of the host system for storing recovery code for execution by the host system processor in an event of corruption of the ROM code, in accordance with a plurality of modes of operation including at least:
a normal mode of operation that occurs in response to absence of a corruption of the ROM code in which the controlling of connectivity causes the host system processor to be communicatively coupled to the primary ROM and communicatively decoupled from the recovery ROM, such that the host system processor loads and executes the ROM code during boot of the host system;
a primary ROM recovery mode of operation that occurs in response to presence of the corruption of the ROM code in which the controlling of connectivity causes the host system processor to be communicatively coupled to the primary ROM and the recovery ROM, such that the host system processor loads and executes the recovery code during boot of the host system; and
a recovery ROM update mode in which the controlling of the connectivity causes the host system processor to be communicatively coupled to the primary ROM and communicatively decoupled from the recovery ROM and causes a management controller communicatively coupled to the host system processor and configured to provide management of the information handling system via management traffic communicated between the management controller and a dedicated management network external to the information handling system to be sequentially communicatively coupled to non-transitory computer-readable media having a recovery source image and communicatively coupled to the recovery ROM, such that the management controller updates the recovery ROM based on content of the recovery source image.

9. The method of claim 8, wherein in the primary ROM recovery mode of operation, controlling of the connectivity causes the host system processor to be communicatively coupled to the primary ROM and the recovery ROM such that the recovery code executing on the host system processor repairs the corruption of the ROM code.

10. The method of claim 9, wherein in the primary ROM recovery mode of operation the controlling of the connectivity causes, responsive to a completion of copying of at least the portion of the recovery code to the primary ROM in order to repair the corruption of the ROM code, the host system processor to be communicatively coupled to the primary ROM and communicatively decoupled from the recovery ROM and further causes the host system to reboot, such that the host system processor loads and executes the ROM code during the reboot of the host system.

11. The method of claim 8, wherein the management controller comprises a baseboard management controller.

12. The method of claim 8, wherein the management controller updates the recovery ROM without accessing the primary ROM.

13. The method of claim 8, wherein the management controller verifies authenticity of the recovery source image before updating the recovery ROM.

14. The method of claim 8, wherein the ROM code comprises a basic input/output system.

15. The method of claim 8, wherein the controlling of the connectivity is performed by a management controller.

16. An article of manufacture comprising:
a non-transitory computer-readable medium; and
computer-executable instructions carried on the computer-readable medium, the instructions readable by a processor, the instructions, when read and executed, for causing the processor to:
control connectivity among a host system processor of a host system of an information handling system, a primary read-only memory (ROM) of the host system for storing ROM code for execution by the host system processor, and a recovery ROM of the host system for storing recovery code for execution by the host system processor in an event of corruption of the ROM code, in accordance with a plurality of modes of operation including at least:
a normal mode of operation that occurs in response to absence of a corruption of the ROM code in which the controlling of connectivity causes the host system processor to be communicatively coupled to the primary ROM and communicatively decoupled from the recovery ROM, such that the host system processor loads and executes the ROM code during boot of the host system;
a primary ROM recovery mode of operation that occurs in response to presence of the corruption of the ROM code in which the controlling of connectivity causes the host system processor to be communicatively coupled to the primary ROM and the recovery ROM, such that the host system processor loads and executes the recovery code during boot of the host system; and a recovery ROM update mode in which the controlling of the connectivity causes the host system processor to be communicatively coupled to the primary ROM and communicatively decoupled from the recovery ROM and causes a management controller communicatively coupled to the host system processor and configured to provide management of the information handling system via management traffic communicated between the management controller and a dedicated management network external to the information handling system to be sequentially communicatively coupled to non-transitory computer-readable media having a recovery source image and communicatively coupled to the recovery ROM, such that the management controller updates the recovery ROM based on content of the recovery source image.

17. The article of claim 16, wherein in the primary ROM recovery mode of operation, controlling of the connectivity causes the host system processor to be communicatively coupled to the primary ROM and the recovery ROM such that the recovery code executing on the host system processor repairs the corruption of the ROM code.

18. The article of claim 17, wherein in the primary ROM recovery mode of operation the controlling of the connectivity causes, responsive to a completion of copying of at least the portion of the recovery code to the primary ROM in order to repair the corruption of the ROM code, the host system processor to be communicatively coupled to the primary ROM and communicatively decoupled from the recovery ROM and further causes the host system to reboot, such that the host system processor loads and executes the ROM code during the reboot of the host system.

19. The article of claim 16, wherein the management controller comprises a baseboard management controller.

20. The article of claim 16, wherein the management controller updates the recovery ROM without accessing the primary ROM.

21. The article of claim 16, wherein the management controller verifies authenticity of the recovery source image before updating the recovery ROM.

22. The article of claim 16, wherein the ROM code comprises a basic input/output system.

23. The article of claim 16, wherein the controlling of the connectivity is performed by a management controller.

* * * * *